(12) United States Patent  
Barr

(10) Patent No.: US 6,490,125 B1  
(45) Date of Patent: Dec. 3, 2002

(54) THIN FILM WRITE HEAD WITH IMPROVED YOKE TO POLE STITCH

(75) Inventor: Ronald A. Barr, Mountain View, CA (US)

(73) Assignee: Read-Rite Corporation, Fremont, CA (US)

( * ) Notice: Subject to any disclaimer, the term of this patent is extended or adjusted under 35 U.S.C. 154(b) by 0 days.

(21) Appl. No.: 09/289,692

(22) Filed: Apr. 9, 1999

(51) Int. Cl.[7] .................................................. G11B 5/47
(52) U.S. Cl. ...................................................... 360/126
(58) Field of Search .................................. 360/125, 126

(56) References Cited

U.S. PATENT DOCUMENTS

| | | | |
|---|---|---|---|
| 4,436,593 A | 3/1984 | Osborne et al. ............... 204/15 |
| 4,839,197 A | 6/1989 | Henderson |
| 4,992,901 A | 2/1991 | Keel et al. |
| 5,130,877 A | * 7/1992 | Hsie et al. .................. 360/126 |
| 5,283,942 A | 2/1994 | Chen et al. |
| 5,349,745 A | 9/1994 | Kawabe et al. |
| 5,435,053 A | 7/1995 | Krounbi et al. |
| 5,446,613 A | 8/1995 | Rottmayer |
| 5,452,164 A | 9/1995 | Cole et al. |
| 5,576,914 A | 11/1996 | Rottmayer et al. |
| 5,649,351 A | 7/1997 | Cole et al. |
| 5,668,689 A | 9/1997 | Schultz et al. |
| 5,805,391 A | 9/1998 | Chang et al. |
| 6,018,862 A | * 2/2000 | Stageberg et al. ........ 29/603.14 |

OTHER PUBLICATIONS

Kawabe, T., Fuyama, M., Narishige, S., and Sugita, Y., "Fabrication of Thin Film Inductive Heads With Top Core Separated Structure," *IEEE Transactions on Magnetics*, vol. 27, No. 6, Nov. 1991, pp. 4936–4938.

* cited by examiner

*Primary Examiner*—George J. Letscher
(74) *Attorney, Agent, or Firm*—Carr & Ferrell LLP

(57) ABSTRACT

The present invention provides an write head having an improved upper pole tip-to-yoke stitch. The upper pole tip is formed having an open faced sloping surface at an end of the pole tip distal from an air bearing surface. Preferably the angle of the sloping surface is about 30 degrees. The sloping surface provides a shallow angle for depositing the yoke material over which improves the magnetic properties of the yoke material, particularly in the case of sputtered high moment magnetic materials, and improves the flux flow path through the yoke. As such, the present invention allows conductor coils to be located closer to the air bearing surface without sacrificing yoke material properties and flux flow. The upper pole tip may have a back portion which is formed over an insulation layer located between a write gap layer and a conductor layer. Preferably the insulation layer and the conductor layer or layers are formed having sloping edges with shallow angles of about 30 degrees. An advantage of the present invention is that it allows the yoke and the yoke-to-pole tip stitch to be recessed from the air bearing surface, if desired, to prevent the yoke or yoke-to-pole stitch from inadvertently writing to the media.

19 Claims, 4 Drawing Sheets

THIN FILM WRITE HEAD WITH IMPROVED YOKE TO POLE STITCH

BACKGROUND OF THE INVENTION

1. Technical Field

The present invention relates to the field of thin film write heads.

2. Background Art

Data is stored on magnetic media by writing on the magnetic media using a write head. Magnetic media can be formed in any number of ways, such as tape, floppy diskette, and hard disk. Writing involves storing a data bit by utilizing magnetic flux to set the magnetic moment of a particular area on the magnetic media. The state of the magnetic moment is later read, using a read head, to retrieve the stored information.

Data density is determined by the amount of data stored on an area of magnetic media and depends on how much area must be allocated to each bit. To decrease bit size, head size is decreased by fabricating thin film read and write heads. Thin film heads commonly employ separate write and read heads.

Thin film write heads are typically formed by depositing and etching layers of magnetic, non-magnetic, dielectric, and electrically conductive materials to form the structures of the head. The structures of the head, such as a core, conductors, a yoke, and pole tips, are fabricated in separate steps. This allows the pole tip size to be reduced, thereby reducing the area occupied by the magnetic bits on the media and improving data density. As data bits are placed closer together, larger magnetic flux is required to set the bits to prevent them from inadvertently being changed by adjacent bits, or by stray magnetic flux.

The yoke structure is used to couple the much larger core to the upper of the pole tips. Typically, the yoke is deposited over the top of the conductor layer to attach to the pole tip below. The yoke channels the flux from the larger core into the small pole tip. As the yoke structure narrows and connects to the much smaller pole tip, the flux from the core is channeled into an ever narrowing yoke as it connects to the pole tip.

As ever smaller structures must handle higher magnetic flux, the write head structures, and in particular the yoke structure, become susceptible to saturation. As a result, it is necessary to form the yoke of a material with a sufficiently high magnetic moment to handle high flux density without saturating.

A problem with high magnetic moment material is that imperfections in the uniformity of the material can cause the permeability of the material to degrade. If the imperfections, usually formed during the deposition process, are in an area of high flux density, saturation can occur.

In addition to reducing the size of the write head structures to improve data density, structures of write heads are made small to improve operating frequency. For example, the conductors commonly are located as close as possible to the pole tips to decrease flux path inductance by reducing the length of the flux path. Toward this end, the yoke commonly is joined or stitched to the top of the pole tip so that along with the pole tip, it forms part of the air bearing surface of the write head. An example of such a geometry is disclosed in U.S. Pat. No. 5,649,351 by Cole, et al., issued on Jul. 22, 1997, entitled METHOD OF MAKING THIN FILM MAGNETIC WRITE HEAD, herein incorporated by reference in its entirety. Stitching to the top of the pole tip, however, has drawbacks.

One problem with forming the stitch along the air bearing surface is that, in addition to the primary write gap which is formed to write data to the media, a second write gap could form at the yoke/pole tip interface. The second write gap could form if there are discontinuities at the interface caused by incomplete removal of materials or oxide formation prior to stitching the yoke to the pole tip.

SUMMARY OF THE INVENTION

The present invention provides an write head having an improved upper pole tip-to-yoke stitch. The upper pole tip is formed having an open faced sloping surface at an end of the pole tip distal from an air bearing surface. The sloping surface may be formed by conventional techniques such as ion milling to remove a corner portion of the upper pole tip. Preferably the angle of the sloping surface is between 25 degrees and 45 degrees, with the optimum angle being about 30 degrees.

The sloping surface provides a shallow angle for depositing the yoke material over. The shallow angle improves the magnetic properties of the yoke material, particularly in the case of sputtered high moment magnetic materials, and improves the flux flow path through the yoke. As such, the present invention allows conductor coils to be located closer to the air bearing surface without sacrificing yoke material properties and flux flow.

The upper pole tip may have a back portion which is formed over an insulation layer located between a write gap layer and a conductor layer. Preferably the insulation layer and the conductor layer or layers are formed having sloping edges with shallow angles. Preferably the angle of the sloping edges is between 25 degrees and 45 degrees, with the optimum angle being about 30 degrees.

An advantage of the present invention is that it allows the yoke and the yoke-to-pole tip stitch to be recessed from the air bearing surface, if desired, to prevent the yoke or yoke-to-pole stitch from inadvertently writing to the media.

DESCRIPTION OF THE PREFERRED EMBODIMENTS OF THE INVENTION

Figure 1:
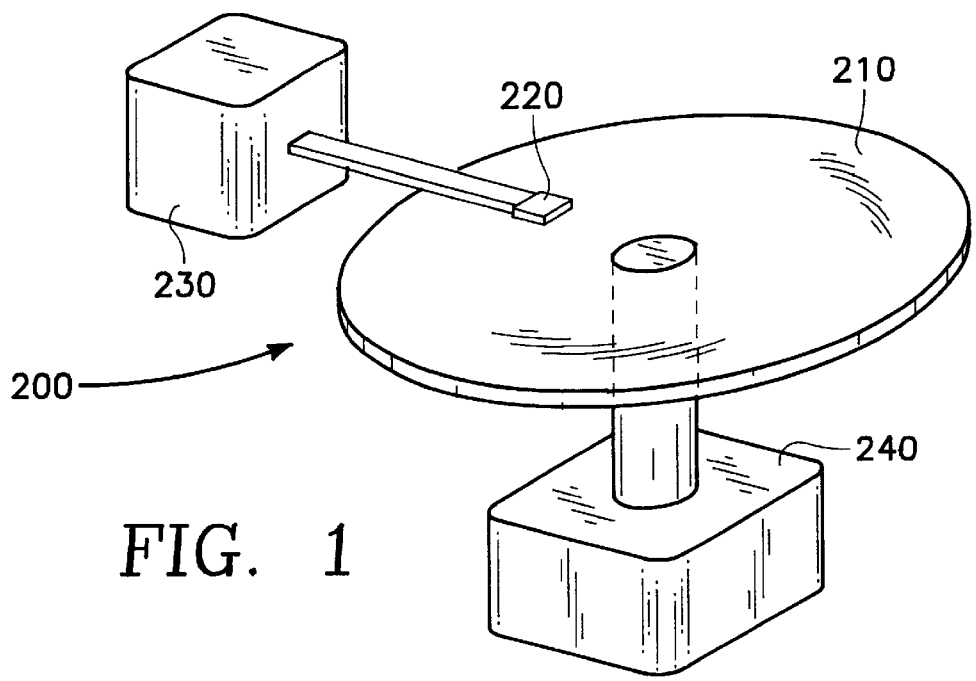
FIG. 1 illustrates a data storage and retrieval apparatus employing the write head of the present invention.

FIG. 1 shows the thin film write head of the present invention embodied in a disk type magnetic data storage and retrieval apparatus 200. The write head of the present invention is located within a merged head assembly 220 which rides above a magnetic storage media 210, depicted in FIG. 1 as a rotatable hard disk type storage media. The hard disk 210 is coupled to a motor 240 to provide rotation of the disk relative to the head assembly 220. An actuating means 230 may be used to position the head assembly 220 above the surface of the media 210 to read and write data in the form of magnetic bits from and to the media 210. The data storage and retrieval apparatus 200, typically has several hard disks 210 and several corresponding head assemblies 220.

Figure 2:
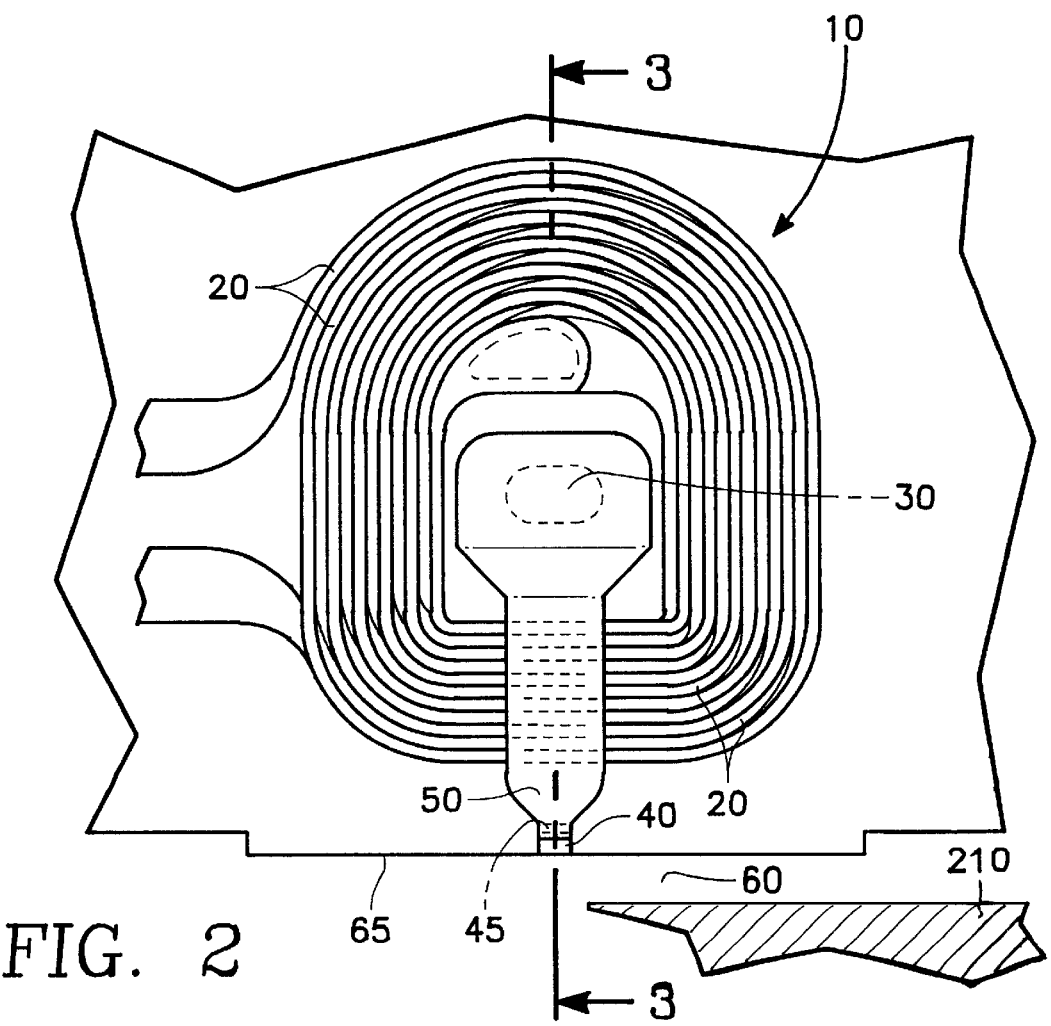
FIG. 2 shows a cross sectional cut away of a possible embodiment of the write head of the present invention.

FIG. 2 depicts a partial cut away of the top view of an embodiment of the structure of the thin film write head 10 of the present invention. Conductors 20 encircle a core 30 to produce magnetic flux in the core 30. The flux generated in the core 30 is coupled to the an upper pole tip 40 via a yoke 50 and returns through a lower pole tip 135 and a lower pole layer 140, shown in FIG. 3, which is coupled to the core 30. The flux generated across a write gap 120, shown in FIG. 3, between the upper pole tip 40 and the lower pole tip 135 writes across an air bearing 60 to a magnetic media 210 which is moved with respect to the write head 10.

Figure 3:
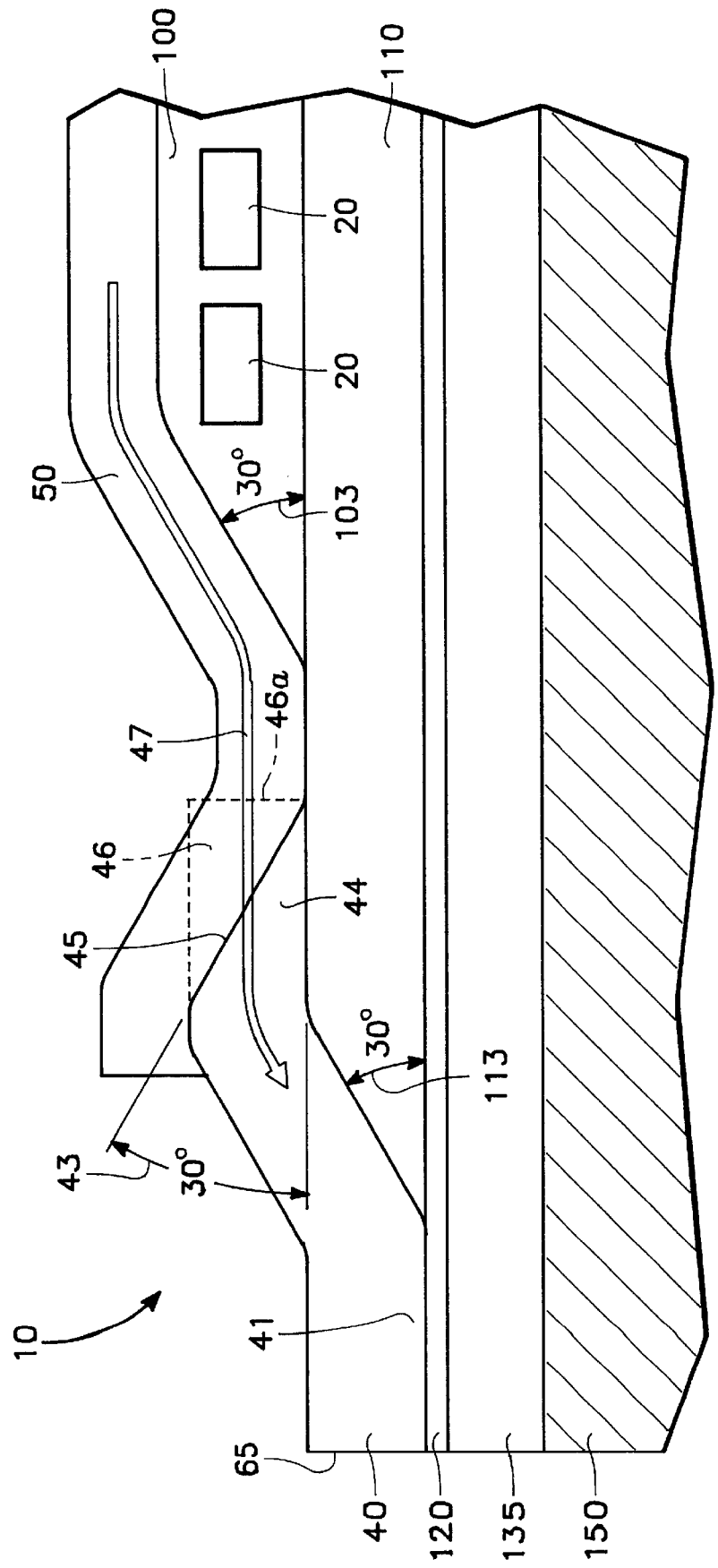
FIG. 3 shows a cross sectional view of the write head of FIG. 2 along 3—3.

FIG. 3 shows a partial cut away of the structure of a preferred embodiment of the write head 10 of the present invention. The write head 10 may be formed over a previously formed read head 150 or directly on a substrate such as silicon, ceramic, or glass. Typically, a lower pole layer 140 is deposited over a read head 150. The lower pole layer 140, the lower pole tip 135, and the write gap 120 are formed of materials and techniques, such as masking, deposition, planarizing, and etching, well know in the art.

In the preferred embodiment, the upper pole tip 40 is formed so that it has a back portion 44 on a previously deposited insulation layer 110. A yoke 50 is deposited over a conductor layer 100 so that it joins with the back portion 44 of the upper pole 40.

The presently preferred embodiment improves write head performance by providing an improved flux flow path 47. One way the preferred embodiment improves the flux flow path 47 is by forming the magnetic flux carrying structures, such as the upper pole tip 40 and the yoke 50, on sloping surfaces having shallow angles with respect to the surface of a planar workpiece. The insulating layer 110 and the conductor layer 100 have sloping edge or wall surfaces with shallow angles 113 and 103. The angles 113 and 103 are formed in the range of about 20–45 degrees, with the preferred angle being about 30 degrees. The shallow angles of 113 and 103 can be formed during the deposition of those layers, by selectively removing the edges by milling or other removal technique, or by any other technique known in the art.

Typically, the upper pole tip 40 and the yoke 50 are deposited by sputtering. When magnetic materials are sputtered onto a steep slope, the magnetic permeability of the material can degrade. This is particularly true with high moment magnetic materials, such as for example CoZrTa, FeN, FeRhN, or the like, which may be used to form the yoke 50.

With the embodiment of FIG. 3, the yoke-to-upper pole tip stitch is recessed from the air bearing surface 65. In this embodiment, the yoke 50 is stitched to the back portion 44 of the upper pole tip 40. The back portion 44 is formed with an substantially planar open faced surface 45. In this embodiment, the open faced surface 45 is formed along a cross section of the back portion 44 at a sloping angle 43. The open faced surface is formed at an end of the pole tip distal from the air bearing surface 65. The open face surface preferably is formed so that the angle 43 is in the range of about 20–45 degrees, with the preferred angle being about 30 degrees with respect to the workpiece surface. The open face area 45 may be formed by ion milling to remove a portion 46 of the pole tip 40 that is typically present after conventional masking and deposition of the upper pole tip 40.

The open face surface 45 provides an improved surface for stitching the yoke. It allows the yoke 50 to be stitched along a much larger cross section of the pole tip 40. This improves flux capability of the write head in several ways. First, it allows the yoke material to be deposited over a shallow angle. This ensures that the yoke material will have uniform properties throughout. If the yoke 50 is deposited over structures having a steep angle, the magnetic properties of the material adjacent the steep angle can degrade causing areas of low permeability. This is particularly true when the yoke material is deposited by sputtering.

Furthermore, as yoke structures decrease in size and are required to handle ever higher flux densities, it is necessary to use materials with higher magnetic permeability. The magnetic properties of such materials are especially sensitive when deposited over steep angles, particularly when deposited by sputtering, which is often the desired deposition method for the higher moment materials. Depositing over a shallow angle, therefore, allows high moment materials to be deposited by sputtering without choking the flux in the yoke 50 near the pole tip 40 due to reduced magnetic permeability.

Another advantage of the open face portion 45 allows more flux to follow a more direct flux path 47 into the pole tip 40 than if the removed portion 46 remained. This will help provide a easy flow of magnetic flux through the yoke 50 near and into the pole tip 40.

An additional advantage of the present invention is that it allows the yoke, and the yoke-to-pole stitch, to be recessed from the air bearing surface 65. This helps prevent unintended writing by the yoke 50 and by the associated yoke-to-upper pole stitch.

Another advantage of the present invention is that it allows the throat 41 geometry and the stitch geometry to be decoupled. With the embodiment of FIG. 3, the yoke is stitched to the back portion 44 of the pole tip. Unlike with a top stitched yoke at the air bearing surface, the throat 41 size can be reduced without causing a corresponding reduction in the size of the stitch area.

Figure 4:
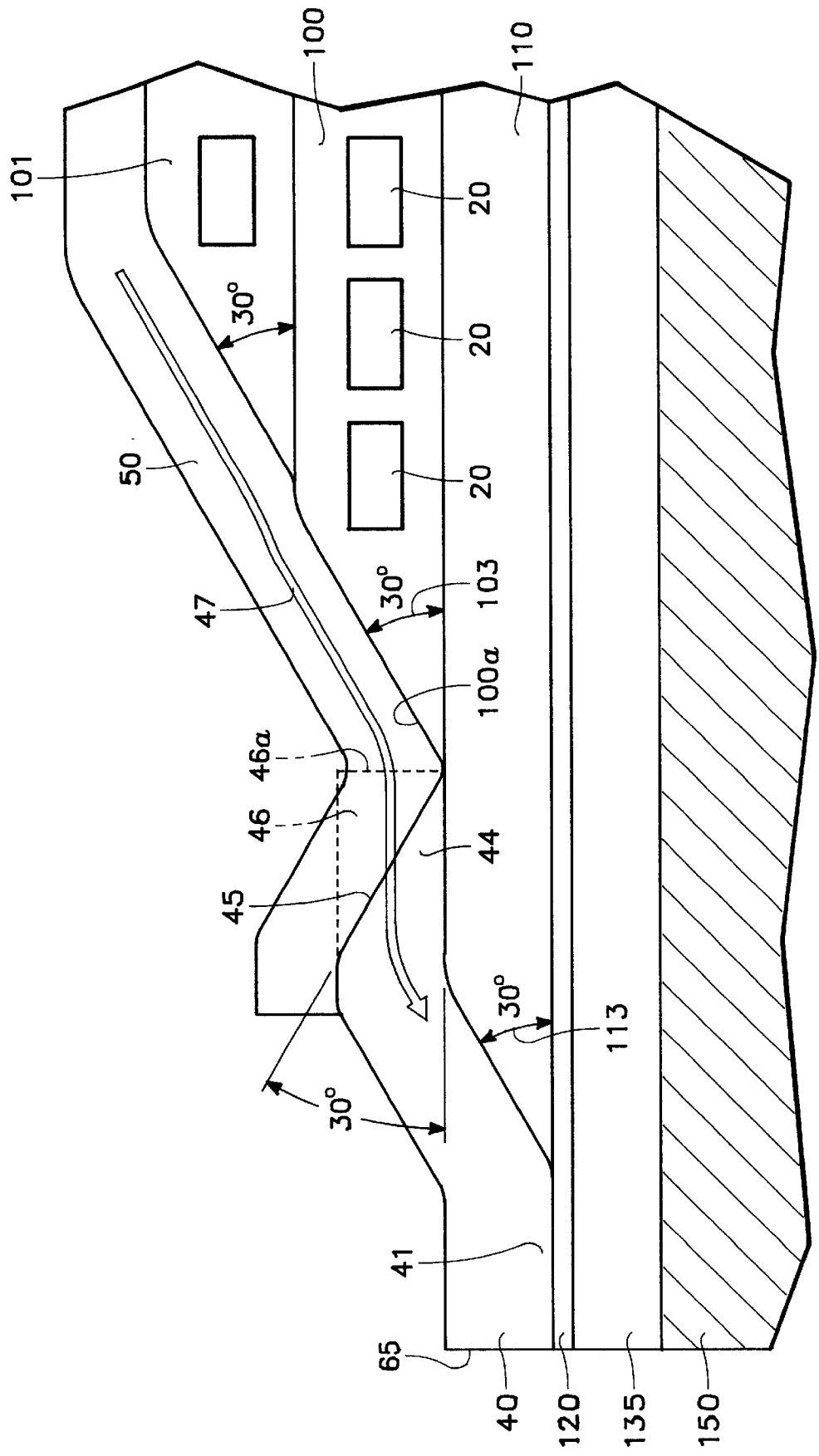
FIG. 4 shows a cross sectional view of an alternative embodiment of the write head of FIG. 2 along 3—3.

Turning to FIG. 4, the open face portion 45 allows conductor layers to be moved closer to the back portion 44 of the pole tip while maintaining sufficient spacing between the edge of the conductor layer 100a and the exposed surface of the back portion to ensure proper deposition of the yoke 50. This is a particular importance when the yoke is deposited by sputtering. If the removed portion 46 remained, the proximity of adjacent surfaces 46a & 100a, of the pole tip 40 and the conductor layer 100, could prevent thorough deposition of the yoke 50 between the surfaces 46a & 100a. In such a case, the yoke 50 would have to be extended over a larger portion of the top of the back portion to provide comparable surface area for stitching. Such an extension would not provide the improved flux flow path 47 and would move the yoke 50 and the stitch closer to the air bearing surface 65. With the present invention, since the conductors can be moved closer to the pole tip 40 without having to provide additional stitching area on the top of the pole tip 40, the present invention, therefore, will allow pole tip 40 size to be reduced while maintaining the yoke 50 and the stitch at a desired minimum distance from the air bearing surface 65.

It is expected that by stitching through the cross-section of the pole tip 40, the yoke 50 may be shortened by about a couple of microns. This would be an improvement of approximately 10% for yoke sizes of 23–25 microns. This improvement reduces inductance and allows the write head to operate at a higher frequency. As yoke structures sizes are reduced in the future to 15 microns or less, the reduction of dead space will produce and even greater percent savings in space.

Although it is preferred to create the pole tip 40 having the back portion 44 deposited on the insulation layer 110 to form the open face stitching area 45, it is possible to reduce the back portion 44, even omit the back portion 44 and form the substantially planar open face area 45 very near or even in the throat portion 41 if desired.

Figure 5:
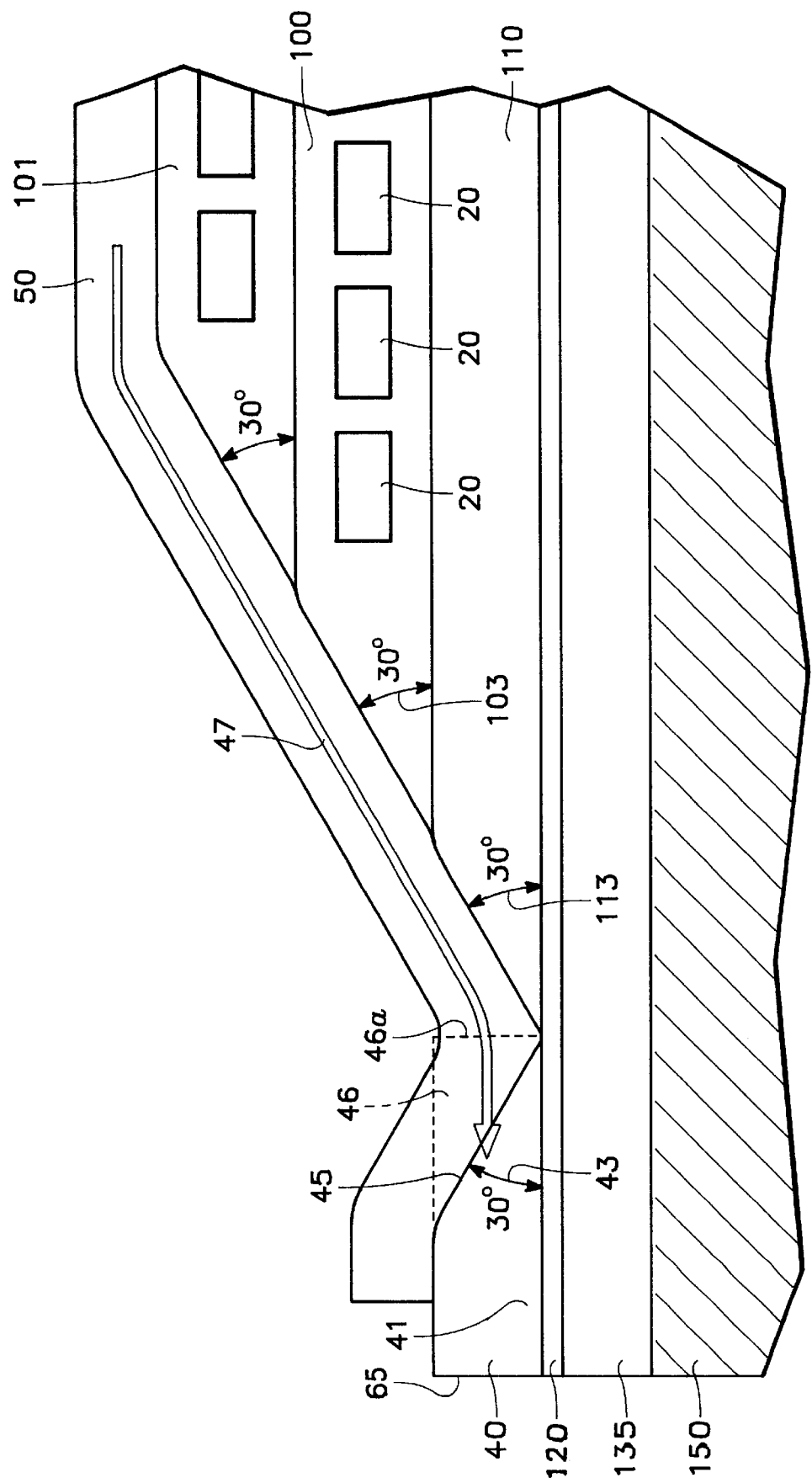
FIG. 5 shows a cross sectional view of an alternative embodiment of the write head of FIG. 2 along 3—3.

FIG. 5 shows the substantially planar open face area 45 formed in the throat portion 41 of the pole tip 40. The embodiment of FIG. 5 allows the conductors layers 100 & 101 to be placed closer to the pole tip 40, reduces pole tip 40 size, and allows the yoke 50 to be recessed from the air bearing surface if desired, in addition to providing other advantages as discussed above.

It is possible with the embodiments of FIGS. 3–5 to form the substantially planar open face area 45 so that the yoke 50 is stitched to only the open face area 45, or so that it is stitched to both the open face area 45 and a portion of a top surface of the upper pole tip 40 as shown in FIGS. 3–5.

While the preferred embodiments of the present invention have been described in detail above, many changes to these embodiments may be made without departing from the true scope and teachings of the present invention. The present invention, therefore, is limited only as claimed below.

What I claim is:

1. A write head comprising:
   an upper pole tip including a top surface opposite a bottom surface and including a planar and sloping open faced surface distal from an air bearing surface and connecting the top and bottom surfaces; and
   a yoke stitched to the open faced surface.

2. The write head of claim 1 wherein the open faced surface forms an angle between 20 degrees and 45 degrees with respect to a planar substrate.

3. The write head of claim 1 wherein the open faced surface forms an angle of 30 degrees with respect to a planar substrate.

4. The write head of claim 1 wherein the upper pole further comprises a back portion, and wherein the open faced surface is formed in the back portion.

5. The write head of claim 4 further comprising an insulative layer having a sloping edge, the upper pole tip extending back from the air bearing surface over the sloping edge of the insulative layer to define the back portion, and wherein the sloping edge of the insulative layer forms an acute angle with respect to a planar substrate.

6. The write head of claim 5 wherein the sloping edge of the insulative layer forms an angle between 20 degrees and 45 degrees with respect to the planar substrate.

7. The write head of claim 5 wherein the sloping edge of the insulative layer forms an angle of 30 degrees with respect to the planar substrate.

8. The write head of claim 5 further comprising a conductor layer formed of an insulative material surrounding conductors, the conductor layer having a sloping side wall facing the open faced surface of the upper pole tip, the side wall of the conductor layer forming an acute angle with respect to the planar substrate.

9. The write head of claim 8 wherein the sloping side wall of the conductor layer forms an angle between 20 and 45 degrees.

10. The write head of claim 8 wherein the sloping side wall of the conductor layer forms an angle of 30 degrees.

11. The write head of claim 1 wherein the yoke is recessed from the air bearing surface.

12. The write head of claim 1, wherein the top surface has a first planar segment defining a plane and the bottom surface has a second planar segment substantially coplanar with the first planar segment.

13. The write head of claim 1, wherein the open faced surface meets the top surface at a first edge and meets the bottom surface at a second edge, and wherein the first edge is closer to the air bearing surface than the second edge.

14. The write head of claim 1, wherein the bottom surface has a planar segment defining a plane at an angle to the open faced surface.

15. A data storage and retrieval apparatus comprising:
   a) a magnetic recording media;
   b) a head assembly positioned adjacent the magnetic recording media comprising:
      (i) a read head; and
      (ii) a write head comprising:
         (1) an upper pole tip including a top surface opposite a bottom surface and including a planar and sloping open faced surface distal from an air bearing surface and connecting the top and bottom surfaces; and
         (2) a yoke stitched to the open faced surface; and
   c) a motor coupled to the media so as to move the media with respect to the head assembly.

16. The data storage and retrieval apparatus of claim 15 wherein the sloping end of the back portion has an angle of between 20 degrees and 45 degrees with a deposition plane.

17. The data storage and retrieval apparatus of claim 16 wherein the yoke is recessed from the air bearing surface.

18. The data storage and retrieval apparatus of claim 16 further comprising an insulative layer having a sloping edge, the upper pole tip extending back from the air bearing surface over the sloping edge of the insulative layer to define the back portion, and wherein the sloping edge of the insulative layer forms an angle of between 20 degrees and 45 degrees with respect to the planar substrate.

19. The data storage and retrieval apparatus of claim 18 further comprising a conductor layer formed of an insulative material surrounding conductors, the conductor layer having a sloping side wall facing the open faced surface end of the upper pole tip, the side wall of the conductor layer forming an angle of between 20 degrees and 45 degrees with respect to the planar substrate.

* * * * *